(12) United States Patent
Asbury et al.

(10) Patent No.: US 8,129,003 B2
(45) Date of Patent: Mar. 6, 2012

(54) VEHICLE PANEL WITH METALIZED FILM

(75) Inventors: James Daniel Asbury, New Hudson, MI (US); Larry Kocher, Canton, MI (US); Paul Alan Forgette, Brownstone, MI (US)

(73) Assignee: Intier Automotive Inc., Newmarket (CA)

( * ) Notice: Subject to any disclaimer, the term of this patent is extended or adjusted under 35 U.S.C. 154(b) by 763 days.

(21) Appl. No.: 10/566,850

(22) PCT Filed: Aug. 11, 2004

(86) PCT No.: PCT/US2004/026322
§ 371 (c)(1),
(2), (4) Date: Feb. 1, 2006

(87) PCT Pub. No.: WO2005/016699
PCT Pub. Date: Feb. 24, 2005

(65) Prior Publication Data
US 2006/0246238 A1 Nov. 2, 2006

Related U.S. Application Data

(60) Provisional application No. 60/494,491, filed on Aug. 12, 2003.

(51) Int. Cl.
*B32B 27/36* (2006.01)

(52) U.S. Cl. .......... 428/31; 426/457; 426/480; 426/523; 156/245; 442/378; 296/210; 296/211; 296/212; 296/213

(58) Field of Classification Search .................. 428/458, 428/31, 457, 480, 523; 156/245; 442/378; 296/210, 211, 212, 213
See application file for complete search history.

(56) References Cited

U.S. PATENT DOCUMENTS 3,583,754 A * 6/1971 Von Berckheim ............ 296/214
(Continued)

FOREIGN PATENT DOCUMENTS

DE 29918214 1/2000
(Continued)

OTHER PUBLICATIONS

Sandrin et. al., X-ray . . . aluminum/ corona treated polyethylene terephthalate interface, 1998, Applied Surface Science, vol. 135, p. 339-349.*

(Continued)

*Primary Examiner* — Jennifer A Chriss
*Assistant Examiner* — Gregory Clark
(74) *Attorney, Agent, or Firm* — Honigman Miller Schwartz and Cohn LLP

(57) ABSTRACT

A vehicle panel (10) includes a core layer (12) and a layer of metalized film (14) bonded to the core layer (12). In one embodiment, the core layer (12) is made of a material with heat absorption or insulation properties. The layer of metalized film (14) is made of a material having heat reflective properties that can be bonded to the core layer (12). Alternatively, a compatible bonding agent can be applied to the core layer, the metalized film, or both. To form the vehicle panel (10), the layer metalized film (14) is positioned on one half of a mold tool and the core layer (12) is positioned on the other half of the mold tool. Heat is applied to the core layer (12) and the mold tool is closed such that the heat from the core layer (12) causes the metalized film (14) to be in a formable state and bonds to the core layer (12).

14 Claims, 1 Drawing Sheet

U.S. PATENT DOCUMENTS

| | | | |
|---|---|---|---|
| 4,068,034 A * | 1/1978 | Segawa et al. | 428/421 |
| 4,851,283 A * | 7/1989 | Holtrop et al. | 442/370 |
| 4,937,125 A | 6/1990 | Sanmartin et al. | |
| 5,016,936 A | 5/1991 | Goodrich | |
| 5,356,511 A | 10/1994 | Hoessel et al. | |
| 5,499,441 A | 3/1996 | Dunton et al. | |
| 2001/0036788 A1 * | 11/2001 | Sandoe et al. | 442/389 |
| 2003/0104168 A1 | 6/2003 | Shane | |
| 2003/0106270 A1 | 6/2003 | Baldoni et al. | |
| 2004/0124668 A1 * | 7/2004 | Ogawa et al. | 296/191 |
| 2004/0202807 A1 * | 10/2004 | Earnest | 428/36.1 |

FOREIGN PATENT DOCUMENTS

| | | |
|---|---|---|
| EP | 0412346 | 2/1991 |
| EP | 0640467 | 3/1995 |
| EP | 0995667 | 4/2000 |
| WO | WO 99/61283 | * 12/1999 |

OTHER PUBLICATIONS

Patent Abstracts of Japan, vol. 2003, No. 11 (Nov. 5, 2003)—JP 2003 212056A (Jul. 30, 2003).

International Search Report from PCT/US2004/026322.

* cited by examiner

VEHICLE PANEL WITH METALIZED FILM

CROSS-REFERENCE TO RELATED APPLICATIONS

This application is a National Stage of International Application No. PCT/US2004/026322 filed Aug. 11, 2004, which claims priority to U.S. Pat. application Ser. No. 60/494,491 filed on Aug. 12, 2003. The disclosures of the above applications are incorporated herein by reference.

BACKGROUND OF THE INVENTION

1. Field of the Invention

The present invention relates in general to a vehicle panel structure, and in particular to a vehicle panel structure that includes a core layer and a layer of metalized film to provide the vehicle panel structure with improved thermal properties.

2. Description of the Related Art

Typically, a vehicle panel, such as a headliner, includes an air gap between the vehicle roof and the headliner to provide a thermal barrier between the vehicle roof and the headliner. Unfortunately, one problem associated with the necessity of this air gap is that the overall distance between the vehicle roof and the headliner is increased.

SUMMARY OF THE INVENTION

The inventor of the present invention has recognized these and other problems associated with conventional vehicle panels, and have developed a vehicle panel comprising a core layer and a layer of metalized film. The layer of metalized film eliminates the need for an air gap between two layers of material, such as a vehicle roof and a headliner, thereby minimizing the thickness of the vehicle panel while improving thermal performance of the vehicle panel structure. Thus, the vehicle panel of the invention comprises a core layer, and a layer of metalized film bonded to the core layer. Preferably, the material for the core layer is compatible with the material for metalized film such that the metalized film is bonded to the core layer with the application of heat. Alternately, a bonding agent may be applied to either the core layer or the metalized film that is compatible to the materials used for the core layer and the metalized film to form the appropriate bond between the core layer and the metalized film upon the application of heat.

A method of manufacturing the vehicle panel comprises the steps of positioning the core layer on a surface of a mold half, and positioning the metalized film on the surface of the other mold half. After placing the core layer and the metalized film, heat is applied to either the core layer or the metalized film by heating the core layer or heating the mold half with the metalized film for a predetermined temperature. Then, the mold halves are closed to press the core layer against the metalized film for a predetermined period of time. As the metalized film is heated, the metalized film becomes formable and is bonded to the surface of the core layer to form the vehicle panel. The mold halves are then opened and the vehicle panel is removed.

BRIEF DESCRIPTION OF THE DRAWINGS

In the drawings:

The FIGURE shows a cross-sectional view of a vehicle panel structure including a core layer and a layer of metalized film according to an embodiment of the invention.

DESCRIPTION OF THE PREFERRED EMBODIMENT

Figure 1:
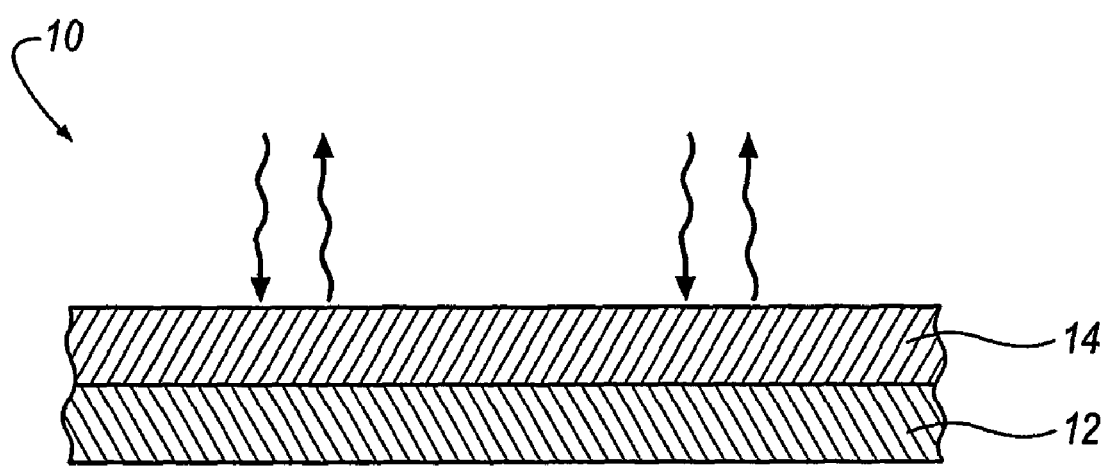

Referring now to the FIGURE, a vehicle panel 10 is shown according to an embodiment of the invention. The vehicle panel 10 includes a core layer 12 and a layer of metalized film 14 bonded to the core layer 12. Optionally, the vehicle panel 10 may include a second layer of metalized film or suitable material (not shown), such as a fabric, bonded or otherwise attached to the opposite surface of the core layer 12.

The core layer 12 may be made of any desirable material. Preferably, the core layer 12 is comprised of any suitable material having insulating properties. For example, the core layer 12 may comprise a foam material, such as polypropylene or the like, and have a density and thickness that may vary depending on the design requirements.

The metalized film 14 may be made of any type of material that is capable of reflecting heat, such as polyethylene terepthalate (PET) or the like. Preferably, the material used for the metalized film 14 is compatible with the material used for the core layer 12 such that the metalized film 14 can form a bond with the core layer 12. One suitable material for the metalized film 14 is commercially available under the trade name METALLYTE™ MET available from ExxonMobil Chemical. The metalized film 14 contains a polymer material, such as polypropylene or the like, that is compatible with the material for the core layer 12. In addition, the metalized film 14 is coated with a metallic material, such as aluminum or the like, that has excellent heat reflection properties.

Ideally, the metalized film 14 is bonded to the outer surface of the core layer 12 that is nearest the source of heat to be reflected by the vehicle panel 10. If necessary, a second layer of metalized film 14 or other suitable material can be applied to an opposite surface of the core layer 12 in situations where the source of heat is emanating from opposite sides of the core layer 12. However, in most situations, the core layer 12 is exposed to only one heat source, and therefore only one layer of metalized film 12 is required for adequate heat reflection.

For example, the core layer 12 with metalized film 14 can be used as a headliner of a vehicle. In this example, the source of heat (indicated by the arrows in the FIGURE) would be the vehicle roof so the metalized film 14 would be applied to only one surface of the core layer 12 that is nearest the vehicle roof. It has been found that when the core layer 12 with metalized film 14 positioned nearest the vehicle roof is used as a headliner that the headliner exhibits superior heat reflection and heat absorption properties, as compared to conventional headliners that require the air gap between the headliner and the vehicle roof for insulation. Thus, the vehicle panel 10 comprising the core layer 12 with metalized film 14 eliminates the need of an air gap. As a result, the vehicle panel 10 when used as a headliner requires less real estate (i.e. has less thickness) as compared to conventional headliners with an air gap.

A method for manufacturing the vehicle panel 10 will now be described. Typically, a mold tool (not shown) includes two mold halves. It is understood that the mold halves have complimentary shapes in the shape of the vehicle panel to be formed. The core layer 12 is positioned in one mold half using conventional means. The metalized film 14 is positioned on the other mold half using conventional means, such as tenured, pinned, clamped, vacuumed, or the like, in a manner known in the art. The core layer 12 is then heated to a predetermined temperature, such as approximately 400 degrees Fahrenheit to cause the core layer 12 to be in a somewhat molten state. The mold halves are then closed together to press the core layer 12 in engagement with the metalized film 14 for a predetermined period of time, such as approximately 30 seconds. When the mold halves are pressed together, some of the heat from the core layer 12 is transferred to the metalized film 14 such that the metalized film 14 becomes formable and molded to the shape of the core layer 12. The source of heat being transferred to the metalized film 14 can be from other sources of heat, such as the mold tool itself, rather than from the core layer 12.

It should be noted that the topography of the core layer 12 and the vehicle panel 10 is non-flat. In these cases, it has been found that the metalized film 14 may become wrinkled in locations where the core layer 12 may have a non-flat topography. However, the metalized film 14 having a substantially flat surface before being placed in the mold half still provides an acceptable bond to the entire surface of the core layer 12 because the metalized film 14 is placed in the mold half with enough tolerance to substantially conform to the topography of the core layer 12 and the vehicle panel 10 being formed.

While the invention has been specifically described in connection with certain specific embodiments thereof, it is to be understood that this is by way of illustration and not of limitation, and the scope of the appended claims should be construed as broadly as the prior art will permit.

What is claimed is:

1. An assembly of a vehicle including at least two panels, the assembly comprising:
    a structural outer roof panel of a vehicle having a non-flat, contoured, passenger-compartment-facing inboard surface;
    a passenger compartment interior trim panel disposed adjacent the structural outer roof panel of the vehicle and having an outboard surface defining a non-flat topography that matches the non-flat, contoured, passenger-compartment-facing inboard surface of the structural outer roof panel, the passenger compartment interior trim panel comprising:
        a core layer having inboard and outboard surfaces;
        a heat formable metalized film layer bonded to the outboard surface of the core layer and defining a non-flat topography that matches the non-flat, contoured, passenger-compartment-facing inboard surface of the structural outer roof panel, the heat formable metalized film layer positioned completely against the passenger-compartment-facing inboard surface of the structural outer roof panel without an air gap between the structural outer roof panel and the passenger compartment interior trim panel; and
        a decorative layer disposed on the inboard surface of the core layer and exposed to the passenger compartment.

2. The assembly of claim 1, wherein the core layer includes a first material and the heat formable metalized film layer includes a second material, the first material being compatible with the second material and each of the first material and the second material includes a polymer material.

3. The assembly of claim 2, wherein the polymer material of the second material that forms the heat formable metalized film layer comprises polyethylene terepthalate (PET).

4. The assembly of claim 2, wherein said first material of the core layer comprises an insulating material.

5. The assembly of claim 4, wherein the first material of the core layer comprises polypropylene.

6. The assembly of claim 1, wherein the passenger compartment interior trim panel comprises a headliner.

7. A vehicle roof construction comprising:
    an outer structural panel having an outer surface and a passenger-compartment-facing inboard surface, wherein the outer structural panel forms a non-flat vehicle roof; and
    an interior trim panel having a vehicle-roof-facing outboard surface and an inner surface, the interior trim panel forming a headliner adjacently-attached to the passenger-compartment-facing inboard surface without an air gap therebetween, the headliner comprising:
        a thermoformed film layer facing and attached to the passenger-compartment-facing inboard surface of the vehicle roof;
        a core layer heat bonded to the film layer, the core layer including a first material having heat absorbing or insulating properties a second material having heat-reflecting properties, each of the first material and the second material including a polymer material, wherein the second material that forms the film layer is coated with a metallic material to define a metalized film layer; and
        a decorative layer disposed on an inboard surface of the core layer and forming the inner surface of the interior trim panel.

8. The vehicle roof construction of claim 7, wherein the polymer material comprising the second material of the metalized film layer comprises:
    a polyethylene terepthalate (PET).

9. The vehicle roof construction of claim 7, further comprising a second layer attached thereto or a surface opposite of the metalized film layer.

10. The vehicle roof construction of claim 9, wherein the second layer is a fabric material.

11. The vehicle panel of claim 1, wherein the decorative layer comprises a metalized film.

12. The vehicle panel of claim 7, wherein the decorative layer comprises a metalized film.

13. The vehicle panel of claim 1, wherein the decorative layer comprises a fabric.

14. The vehicle panel of claim 7, wherein the decorative layer comprises a fabric.

* * * * *